(12) United States Patent
Shin et al.

(10) Patent No.: US 6,447,823 B1
(45) Date of Patent: Sep. 10, 2002

(54) LIQUID YOGURT WITH ENCAPSULATED LACTIC ACID BACTERIA AND METHOD FOR PRODUCING THE SAME

(75) Inventors: Young-Sup Shin, Koori; Byung-Hak Baik, Seoul; Jun-Kyu Lee, Ilsan, all of (KR)

(73) Assignee: Bing-Grae Co., Ltd., Kyunggi-do (KR)

( * ) Notice: Subject to any disclaimer, the term of this patent is extended or adjusted under 35 U.S.C. 154(b) by 0 days.

(21) Appl. No.: 09/170,122

(22) Filed: Oct. 13, 1998

(30) Foreign Application Priority Data

Oct. 14, 1997 (KR) .............................................. 97-52653

(51) Int. Cl.$^7$ .............................................. A23C 9/123
(52) U.S. Cl. ......................................... 426/42; 426/583
(58) Field of Search .............................. 435/260, 252.9; 426/61, 42, 89, 583, 71

(56) References Cited

U.S. PATENT DOCUMENTS 4,624,853 A * 11/1986 Rudin ........................ 426/61
4,956,295 A * 9/1990 Sudoma .................... 435/252.1

FOREIGN PATENT DOCUMENTS

| JP | 61-151127 | 7/1986 |
| JP | 08-242763 | 9/1996 |

* cited by examiner

Primary Examiner—Keith Hendricks
(74) Attorney, Agent, or Firm—Birch, Stewart, Kolasch & Birch, LLP

(57) ABSTRACT

Yogurt containing encapsulated lactic acid bacteria wherein the lactic acid bacteria 1 is encapsulated within acid resistant and intestine-soluble capsules, and wherein the specific gravity of the liquid yogurt is the same or substantially the same as the specific gravity of the lactic acid bacteria containing capsules whereby the capsules are uniformly distributed in the liquid yogurt.

3 Claims, 5 Drawing Sheets

[a]

[b]

LIQUID YOGURT WITH ENCAPSULATED LACTIC ACID BACTERIA AND METHOD FOR PRODUCING THE SAME

BACKGROUND OF THE INVENTION

1. Field of the Invention

The present invention relates to a yogurt containing encapsulated lactic acid bacteria. More particularly, the present invention relates to a yogurt containing encapsulated lactic acid bacteria in which a large number of lactic acid bacteria-containing (hereinafter, referred to as "L.A.B.-containing") capsules, which are packed with an acid resistant and intestine-soluble coating substance, are uniformly distributed in a liquid yogurt. L.A.B.-containing capsules contained in a drinkable and/or liquid yogurt are minimally chewed with the teeth, and are protected from the gastric acid within the stomach, so that the lactic acid bacteria can maximally survive until it reaches the intestine.

Further, the present invention relates to a method for producing (manufacturing) yogurt with encapsulated lactic acid bacteria, in which the yogurt with encapsulated lactic bacteria can be mass-produced by a simple and speedy process at a low cost.

2. Description of the Prior Art

In conventional yogurt, lactic acid bacteria are not encapsulated within an acid resistant and intestine-soluble coating substance. Therefore, when the lactic acid bacteria pass through the stomach, a majority of the lactic acid bacteria are killed.

Conventionally, semi-solid yogurt is produced with encapsulated lactic acid bacteria. In such conventional semi-solid yogurt, the yogurt is eaten with a spoon, and therefore, a majority of the lactic acid bacteria are killed by the gastric acid because the capsules are chewed by the teeth. Therefore, the survival rate of the lactic acid bacteria is low. That is, a majority of the lactic acid bacteria are killed before reaching the intestine, because the chewed capsules cannot protect the lactic acid bacteria from the gastric acid.

With conventional methods for producing semi-solid yogurt containing encapsulated lactic acid bacteria, a drinkable, liquid yogurt with encapsulated lactic acid bacteria cannot be produced. Therefore, the survival rate of the lactic acid bacteria cannot be maximized.

SUMMARY OF THE INVENTION

The present invention is intended to overcome the above-described disadvantages of the conventional techniques.

Therefore, it is an objective of the present invention to provide a yogurt with encapsulated lactic acid bacteria in which the lactic acid bacteria are protected from the gastric acid by being contained in acid resistant and intestine-soluble capsules, thereby maximizing the survival rate of the lactic acid bacteria until it reaches the intestine.

It is another objective of the present invention to provide a method for producing yogurt containing encapsulated lactic acid bacteria which is simple and speedy, and the cost is low.

In achieving the above objectives, the yogurt with encapsulated lactic acid bacteria according to the present invention is characterized in that: a large number of L.A.B.-containing capsules are uniformly distributed in liquid yogurt, with the specific gravity of the liquid yogurt and the specific gravity of the L.A.B.-containing capsules being the same or substantially, the same. Thus the capsules are uniformly distributed in the drinkable, liquid yogurt, making the chewing of the capsules minimal which protects the lactic acid bacteria from being killed by the gastric acid whereby the survival rate of the lactic acid bacteria is maximized.

In another aspect of the present invention, the method for producing yogurt containing encapsulated lactic acid bacteria according to the present invention comprises steps of: preparing L.A.B.-containing capsules and liquid yogurt, wherein the specific gravity of the capsules and the specific gravity of the liquid yogurt are the same or substantially the same; placing the L.A.B.-containing capsules into a lower portion of a yogurt bottle; and adding liquid yogurt to the yogurt bottle containing the L.A.B. capsules, whereby the L.A.B.-containing capsules are automatically and uniformly dispersed in the yogurt within the interior of the bottle. The entire process being carried out in a simple and speedy manner at a low cost.

BRIEF DESCRIPTION OF THE DRAWINGS

The above objectives and other advantages of the present invention will become more apparent by describing in detail the preferred embodiment of the present invention with reference to the attached drawings in which:

FIG. 2(a) and 2(b) show a partly cut-out sectional view showing the L.A.B.-containing capsule according to the present invention, in which:

FIG. 2(a) illustrates one embodiment of the L.A.B.-containing capsule; and

FIG. 2(b) illustrates another embodiment of the L.A.B.-containing capsule;

FIG. 4(a) and 4(b) illustrate a fourth step of the method for producing yogurt containing encapsulated lactic acid bacteria, in which:

FIG. 4(a) is a longitudinal, section view showing an initial stage of filling the container with liquid yogurt; and FIG. 4(b) is a longitudinal sectional view showing an intermediate stage of filling the container with liquid yogurt.

DETAILED DESCRIPTION OF THE PREFERRED EMBODIMENTS

Figure 1:
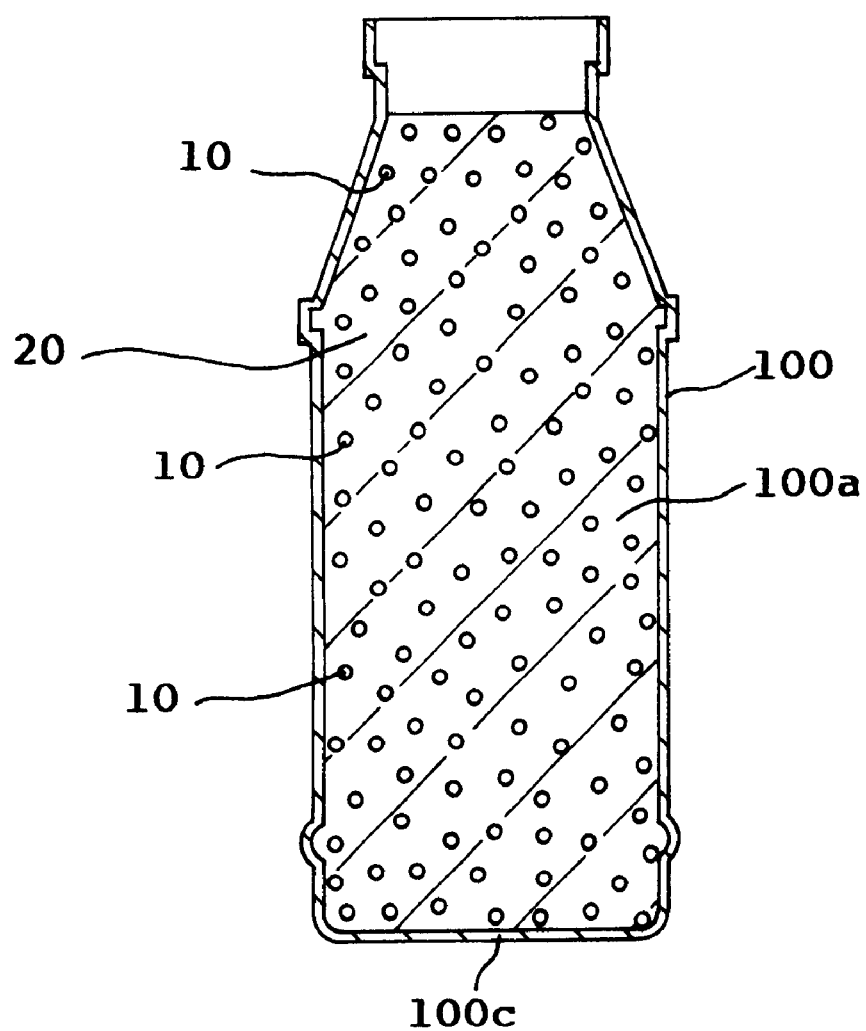
FIG. 1 is a longitudinal, sectional view showing an embodiment of the yogurt bottle containing the liquid yogurt with encapsulated lactic acid bacteria according to the present invention.
Figure 2:
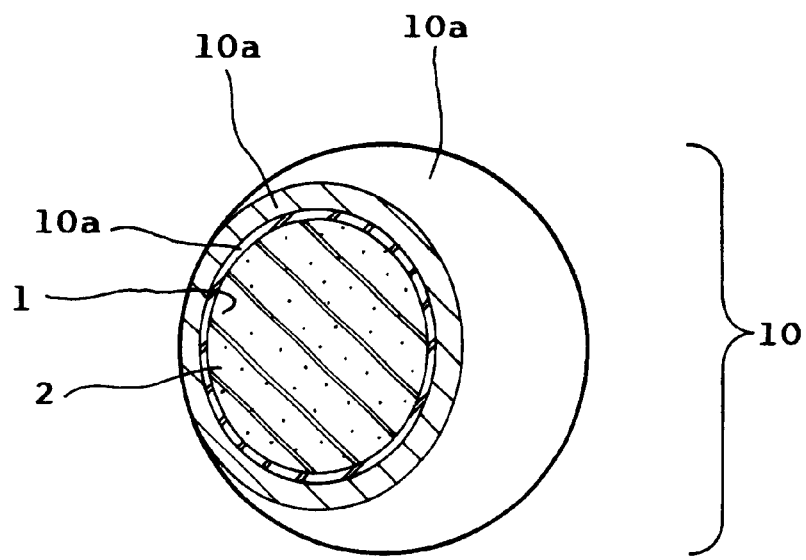
Figure 2:
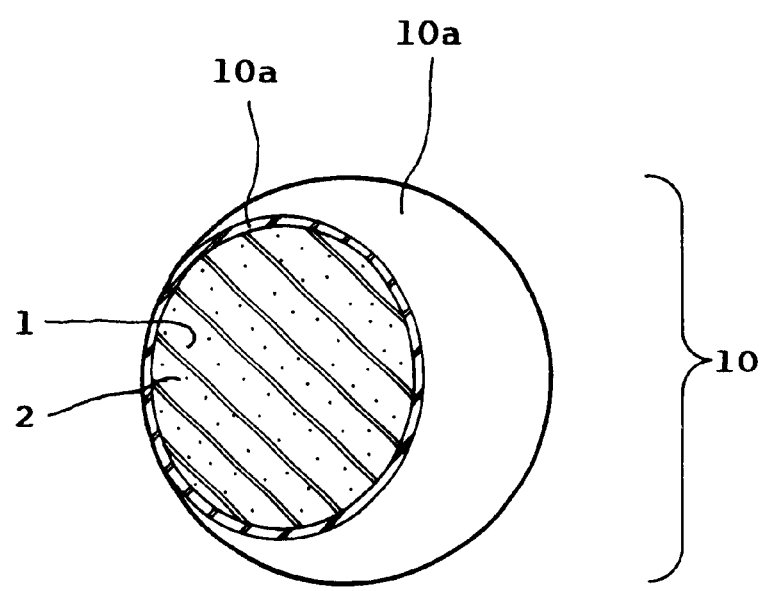

As shown in FIGS. 1, 2(a) and 2(b), the L.A.B.-containing capsule 10 contains lactic acid bacteria (which are shown by the dots in FIG. 2), and is encapsulated by a coating substance 10a which is acid resistant and intestine-soluble. By "intestine-soluble" is meant that the capsules 10 are decomposed within the human intestine by the digestive enzymes of the intestine and the pH level of the intestine. The capsules 10 are hydrophobic within a limit as far as the operations of the digestive enzymes of the intestine and the pH level of the intestine are concerned.

In order that a large number of the L.A.B.-containing capsules 10 can be uniformly distributed in the liquid yogurt 20, the specific gravity of the liquid yogurt 20 is made to be the same as or almost the same as the required specific gravity of the L.A.B.-containing capsules 10. This permits a large number of the L.A.B.-containing capsules to be uniformly distributed within the liquid yogurt 20.

The required specific gravity of the L.A.B.-containing capsules 10 is preferably 0.9 to 1.5, while the specific gravity of the liquid yogurt is preferably about 0.9 to 1.5.

In another embodiment of the present invention, the L.A.B.-containing capsule 10 contains lactic acid bacteria which is encapsulated by a coating substance 10a which is acid resistant and intestine-soluble. Thus, in order that a large number of the L.A.B.-containing capsules 10 can be uniformly distributed in the liquid yogurt 20, the specific gravity of the L.A.B.-containing capsules 10 is made to be the same as or almost the same as the required specific gravity of the liquid yogurt 20. Thus the L.A.B.-containing capsules 10 are uniformly distributed in the liquid yogurt 20.

The required specific gravity of the liquid yogurt 20 is preferably 0.9 to 1.5, while the specific gravity of the L.A.B.-containing capsules 10 is preferably about 0.9 to 1.5.

In the above described embodiments, the lactic acid bacteria is mixed with a mixing substance 2 such as a hardened oil and a starch, etc., this mixture is then encapsulated within the L.A.B.-containing capsule 10. The outside layer of the mixture should be dried, to form the coating substance 10a. Or the outside of the mixture is spread with a mixing substance 2 such as a hardened oil and starch, etc. to form a coating substance 10a. This corresponds to FIG. 2(b), and is a simple coating. If the simply coated mixture is again coated with a coating substance consisting of a gelatin and pectin, this corresponds to FIG. 2(a), and is a dual coating.

The liquid yogurt 20 having the required specific gravity can be made by adjusting the kind and ratio of raw mil, non-fat milk, powered milk, sugars, stabilizers or other additives and by fermenting a combination thereof.

The required specific gravity of the liquid yogurt 20 equivalent to 0.9 to 1.5 is realized by using preferable combinations and ratios of, raw milk, non-fat milk, powdered milk, sugars, stabilizers and other additives.

The required specific gravity of the L.A.B.-containing capsules 10 can be made by adjusting the kinds of, and combination ratios of, the coating substance 10a, and by adjusting the kinds of and combination ratio of, the hardened oil, and starch which are mixed with the lactic acid bacteria 1.

The required specific gravity of the L.A.B.-containing capsules 10 equivalent to 0.9 to 1.5 are realized by the preferable kinds of, and the preferable combination ratio of, the coating substance 10a, and by the preferable kinds of, and the preferable combination ratio of, the hardened oil and the starch which are mixed with the lactic acid bacteria 1.

The L.A.B.-containing capsules 10 should be preferably present in an amount of 0.1 wt % to 1.0 wt % in the liquid yogurt 20.

The liquid yogurt 20 contains about 100 million lactic acid bacteria per ml of the liquid yogurt 20 like the general yogurt, and in addition, the L.A.B.-containing capsules 10 contain about one million of lactic acid bacteria per ml of the liquid yogurt 20.

The diameter of the L.A.B.-containing capsule 10 is preferably 1 mm to 3 mm.

The lactic acid bacteria 1 refers to the general lactic acid bacteria, i.e., the microbes which produce lactic acid, acetic acid and the like by decomposing carbohydrates such as glucose and lactose. Morphologically, they are gram-positive, and are bacillus or micrococcus. They do not form an endospore, but are mobile. Physiologically, they are anaerobic, and are catalase-negative. The use sugar as the only source of energy. They convert sugar into lactic acid by 50% or more.

Categorically, the lactic acid bacteria includes: Lactobacillus, Leuconostoc, Pediococcus, Streptococcus and the like. Further they include bifidobacterium microbes which produce lactic acid by less than 50% of the glucose. Morphologically, the bifidobacterium belong to bacillus, and are grown into various kinds depending on the growing conditions. They are similar to the Lactobacillus, but they are acid non-resistant, and convert glucose into lactic acid and acetic acid at a ratio of 2:3.

According to the report of the FAO/WHO, "the fermented yogurt is a solid-fluid product which is obtained by lactic-acid-fermenting a milk or a milk product (sterilized or condensed) by the help of the operations of Lactobacillus bulgaricus and Streptococcus thermiphilus. Further, it should be alive and should contain microbes profusely." However, besides the above two microbes, Lactobacillus acidophilus or bifidus is also used in producing (manufacturing) the yogurt.

As shown in FIGS. 1 to 5, the method for producing the yogurt with encapsulated lactic acid bacteria according to the present invention comprises in a first step, preparing L.A.B.-containing capsules 10 which contain lactic acid bacteria and are coated with an acid resistant and intestine-soluble coating substance 10a, and have a required specific gravity; in a second step, preparing liquid yogurt 20 having a specific gravity the same as or substantially same as the required specific gravity of the L.A.B.-containing capsules 10; in a third step, adding the L.A.B.-containing capsules 10 prepared by the first step to the lower portion 100b of the interior 100a of a yogurt bottle 100;

and in a fourth step introducing liquid yogurt 20 prepared by the second step into the interior 100a of the yogurt bottle 100 containing the L.A.B.-containing capsules 10. The required specific gravity of the L.A.B.-containing capsules 10 is preferably 0.9 to 1.5, while the specific gravity of the liquid yogurt 20 is preferably about 0.9 to 1.5.

Preferably, in the L.A.B.-containing capsules 10, the lactic acid bacteria 1 is mixed with a substance 2 such as a hardened oil and starch, etc. and the mixture thus formed should be dispersed within the L.A.B.-containing capsule 10. The outside layer of the mixture should be dried, to form a coating substance 10a, or the mixing substance 2 such as hardened oil and starch, etc. can be spread on the outside of the mixture, to form a coating substance 10a. This corresponds to FIG. 2(b), and is a simple coating. If the simply coated mixture is again coated with a coating substance consisting of gelatin and pectin, this corresponds to FIG. 2(a), and is a dual coating.

The L.A.B.-containing capsules 10 having the desired specific gravity can be made by properly adjusting the kind of the substance 10a and the combination ratio thereof and by properly adjusting kinds of hardened oil and starch which are combined with the lactic acid bacteria 1, as well as the combination ratio thereof.

The required specific gravity of the L.A.B.-containing capsules 10 equivalent to 0.9 to 1.5 is realized by the preferable kind of coating substance 10a and the preferable combination ration of the coating substance 10a, and by the preferable kind of hardened oil and starch which are combined with the lactic acid bacteria 1, and the preferable combination ratio thereof.

The liquid yogurt 20 having the required specific gravity can be made by adjusting kinds of, and a combination ratio of, raw milk, non-fat milk, powered milk, sugars, stabilizers or other additives and by the fermenting combination thereof.

The specific gravity of the liquid yogurt 20 equivalent to about 0.9 to 1.5 is realized by preferable kinds of, and preferable combination ratios of raw milk, non-fat milk, powdered milk, sugars, stabilizers, and other additives.

In another embodiment of the present invention, the method for producing the yogurt with encapsulated lactic acid bacteria according to the present invention comprises in a first step, preparing liquid yogurt 20 having a required specific gravity; in a second step, preparing L.A.B.-containing capsules 10 which contain lactic acid bacteria and are coated with an acid resistant and intestine-soluble coating substance 10a, and have a specific gravity the same as or substantially the same as the required specific gravity of the liquid yogurt 20; in a third step adding the L.A.B.-containing capsules 10 prepared by the second step into the lower portion 100b of the interior 100a of a yogurt bottle 100;

and in a fourth step, introducing liquid yogurt 20 prepared by the first step into the interior 100a of the yogurt bottle 100, containing the L.A.B.-containing capsules 10.

The specific gravity of the liquid yogurt 20 is preferably 0.9 to 1.5, while the specific gravity of the L.A.B.-containing capsules 10 is preferably about 0.9 to 1.5.

Preferably, in the L.A.B.-containing capsules 10, the lactic acid bacteria 1 should be mixed with a mixing substance 2 such as hardened oil and starch, etc. And the mixture thus formed should be contained within the L.A.B.-containing capsule 10. The outside layer of the mixture should be dried, to form a coating substance 10a, or the mixing substance 2 such as hardened oil and starch, etc., should be spread on the outside of the mixture, to form a coating substance 10a. This corresponds to FIG. 2(b), and is a simple coating. If the simply coated mixture is again coated with a coating substance consisting of gelatin and pectin, this corresponds to FIG. 2(a), and is a dual coating.

The liquid yogurt 20 having the required specific gravity can be made by adjusting the kinds of, and the combination ratio of raw milk, non-fat milk, powered milk, sugars, stabilizers or other additives and by fermenting a combination thereof.

The required specific gravity of the liquid yogurt 20 equivalent to 0.9 to 1.5 is realized by utilizing preferable kinds of, and preferable combination ratios of, raw milk, non-fat milk, powdered milk, sugars, stabilizers, and other additives.

When preparing the L.A.B.-containing capsules 10, the required specific gravity of the L.A.B.-containing capsules 10 can be made by properly adjusting the kind of the coating substance 10a and the combination ratio thereof, and by properly adjusting the kinds of hardened oil and starch which are utilized with the lactic acid bacteria 1, and the combination ratio thereof.

The specific gravity of the L.A.B.-containing capsules 10 equivalent to about 0.9 to 1.5 is realized by the preferable kind of the coating substance 10a and combination ratio of the coating substance 10a, and by the preferable kinds of hardened oil and starch which are combined with the lactic acid bacteria 1, and the preferable combination ratio of the hardened oil and the starch.

The L.A.B.-containing capsules 10 are introduced into the interior 100a of the yogurt bottle 100 in the following manner. An injection device with a proper amount of L.A.B.-containing capsules 10 contained therein is installed above a conveyor belt upon which the yogurt bottles 100 are to be conveyed. When the yogurt bottles 100 pass below the injection device, proper amounts of the L.A.B.-containing capsules 10 are put into the yogurt bottles 100.

The injection device is controlled to put or not to put the L.A.B.-containing capsules 10 into the bottles 100 discretely according to the signal of a sensor which is attached at one side of a capsule orifice of the injection device.

After undergoing the fourth step, caps are fitted to the yogurt bottles 100, thereby completing the production (manufacture).

Now the operation of the present invention is performed as follows:

In the yogurt with encapsulated lactic acid bacteria of the present invention, a large number of L.A.B.-containing capsules 10 are dispersed in the liquid yogurt 20. Also, the specific gravity of the liquid yogurt 20 and the specific gravity of the L.A.B.-containing capsules 10 are made to be the same or almost the same. Therefore, there is no difference or almost no difference between the specific gravity of the liquid yogurt 20 and the L.A.B.-containing capsules 10.

Therefore, once the L.A.B.-containing capsules 10 are uniformly distributed in the liquid yogurt 20, the uniform distribution can be maintained for a long time. Therefore, the quality of the product is estimated to be very high.

Thus the yogurt with lactic acid bacteria of the present invention in which the L.A.B.-containing capsules 10 are uniformly distributed is a liquid type drinkable one. Therefore, the L.A.B.-containing capsules 10 need not be chewed, but can be drunk directly into the stomach. Since the chewing is eliminated, the lactic acid bacteria are protected from the gastric acid, so that the survival rate of the lactic acid bacteria can be maximized.

Since the coating substance 10a of the L.A.B.-containing capsule 10 is acid resistant, the lactic acid bacteria 1 which are contained in the L.A.B.-containing capsules 10 can be protected from the gastric acid. Therefore, the lactic acid bacteria 1 survives in the midst of the gastric acid and arrives in the intestine with a maximum survival rate. The L.A.B.-containing capsules 10 which have passed through the stomach are dissolved with the intestine by the digestive enzymes of the intestine and by the pH state of the intestine. Therefore, the lactic acid bacteria 1 are released from the capsules 10 to perform beneficial operations within the intestine. This will be described in further details below.

The yogurt is very high in its nutritional and health effects compared with an unfermented milk. Specifically, nutritionally, the fermented yogurt is improved in its storability due to its lactic acid formed during the fermentation. Further, the flavor is soft, and the sour taste is pleasant. Also, the lactic acid inhibits the growth of harmful microbes. In addition, the absorption of milk protein and lactose are promoted, and the utilization of inorganic substances is improved. Further, the carriage of the contents of the stomach to the intestine is prompted, and the secretion of the gastric fluid is accelerated.

The lactic acid bacteria are engaged in growth with other microbes, and therefore, an antagonistic operation results.

Or the bacteria produces lactic acid or acetic acid, and therefore, inhibits the proliferation of the microbes which are susceptible to acids, or they kill these microbes. Further, the bacteria improves the number composition ratios of different kinds of microbes, and exerts a laxative function. Further they cause a reduction of the cholesterol level within the blood, and give an anti-cancer effect.

In order to obtain the above-described effects, the yogurt which contains the lactic acid bacteria has to pass through the stomach and has to arrive at the intestine. The pH value of the stomach is 1–2, and the stomach becomes completely empty in about 4 hours after food ingestion. At or below a pH value of 4, 99.9% of the general microbes are killed within 30 minutes. At or below pH 3, i.e., in the normal stomach, 99% of microbes are killed within 15 minutes, and after one hour, most of microbes are killed. To look into the experiments on the lactic acid bacteria when producing (manufacturing) the yogurt, the lactic acid bacteria including bifidus show a survival rate of 1% at pH 1 within one hour. Even if the pH level is raised to 2–4, the number of surviving microbes is steeply decreased with a lapse of time. Thus, although the lactic acid bacteria are beneficent, if the beneficent effects are to be reaped, the microbes have to survive until they arrive at the intestine after passing through the stomach in the midst of the secretion of the gastric acid. In order to improve the survival rate of the lactic acid bacteria, conventionally, there has been invented a yogurt with encapsulated lactic acid bacteria. However, this conventional yogurt is a semi-solid type which has to be eaten by a spoon. That is, it cannot be drunk. Therefore, when it is eaten by using a spoon, the capsules are chewed by the teeth within the mouth, and as a result the lactic acid bacteria within the capsules are released to be killed within the stomach by the secreted gastric acid. Therefore, a majority of the acid resistant and intestine-soluble capsules become useless, and as a result the survival rate of the lactic acid bacteria is drastically reduced. Such is the problem of the conventional semi-solid type capsuled yogurt.

The coating substance 10a of the L.A.B.-containing capsule 10 is acid resistant, and therefore, the capsule 10 does not dissolve within the gastric acid. However, the coating substance 10a of the L.A.B.-containing capsule 10 is intestine-soluble, and therefore, the capsule 10 does not dissolve within the gastric acid. However, the coating substance 10a of the L.A.B.-containing capsule 10 is intestine-soluble, and therefore, it is decomposed or dissolved within the intestine. Consequently the lactic acid bacteria contained with the L.A.B.0-containing capsule 10 are released and dispersed.

In the yogurt with encapsulated lactic acid bacteria of the present invention, the quid yogurt 2 contains 100 millions or more of lactic acid bacteria per ml, and in addition the L.A.B.-containing capsules 10 contains one million or more lactic acid bacteria per ml of the liquid yogurt 20. The survival rate of the lactic acid bacteria is as follows. That is, within an HCl solution having a pH value of 1.2 and at 37° C., the lactic acid bacteria lying outside the L.A.B.-containing capsules 10 shows a survival rate of 0.001% or less after a time elapse of two hours, while the lactic acid bacteria contained in the L.A.B.-containing capsules 10 show a survival rate of 10% or more.

In the case of a yogurt containing no L.A.B.-containing capsules 10, if the gastric acid has a pH value of 1.2, 10 to 100 thousand lactic acid bacteria can reach the intestine alive per ml of the yogurt. However, in the case of the liquid yogurt containing the L.A.B.-containing capsules 10, one hundred thousand or more lactic acid bacteria are added to the above described survival rate per ml of the liquid yogurt 20. If the gastric acid has a pH value of 3.5, and if the yogurt has no L.A.B.-containing capsules 10, then the lactic acid bacteria can arrive at the intestine with a survival rate of 1% or less. However, if the liquid yogurt 20 contains the L.A.B.-containing capsules 10, the lactic acid bacteria reach the intestine with a survival rate of 25% or more. Therefore, it is evident that the yogurt with encapsulated lactic acid bacteria of the present invention gives a drastically improved effect of lactic acid bacteria compared with the conventional drinkable yogurt.

When the taste, economy and the beneficial effects are considered, the L.A.B.-containing capsules 10 should be preferably put in, by an amount of 0.1 wt % to 1 wt % of the liquid yogurt 20.

The size of the L.A.B.-containing capsules 10 is about 1 to 3 mm, and therefore, they are not chewed by the teeth, but can be smoothly drunk.

Now the method for producing the yogurt with encapsulated lactic acid bacteria according to the present invention will be described as to its operation.

In the method for making yogurt with encapsulated lactic acid bacteria of the present invention, based on the first step and the second step of the first embodiment, and based on the first step and the second step of the second embodiment, the specific gravity of the L.A.B.-containing capsules 10 and the specific gravity of the liquid yogurt 20 are made bilaterally to be the same or almost the same.

The preparation of liquid yogurt 20 with a desired specific gravity can easily be done by adjusting the kinds of, and the combination ratio of ingredients such as raw milk, non-fat mil, powdered milk, sugars, stabilizers and other additives, and by fermenting the combination thereof.

The required specific gravity of the liquid yogurt 20 is equivalent to 0.9 to 1.5 which can be realized by properly adjusting the kinds of and combination ratio of raw milk, non-fat mil, powdered milk, sugars, stabilizers and other additives.

The preparation of the L.A.B.-containing capsules 10 with the desired specific gravity can easily be done by properly adjusting the kind of, and the combination ratio of, the coating substance 10a, and by properly adjusting kinds of, and the combination ratio of the hardened oil and the starch which are combined with the lactic acid bacteria 1.

The required specific gravity of the L.A.B.-containing capsules 10 equivalent to 0.9 to 1.5 can be realized by properly adjusting the kind of, and the combination ratio of, the coating substance 10a, and by properly adjusting the kind of, and the combination ratio of the hardened oil and the starch which are combined with the lactic acid bacteria 1.

Figure 3:
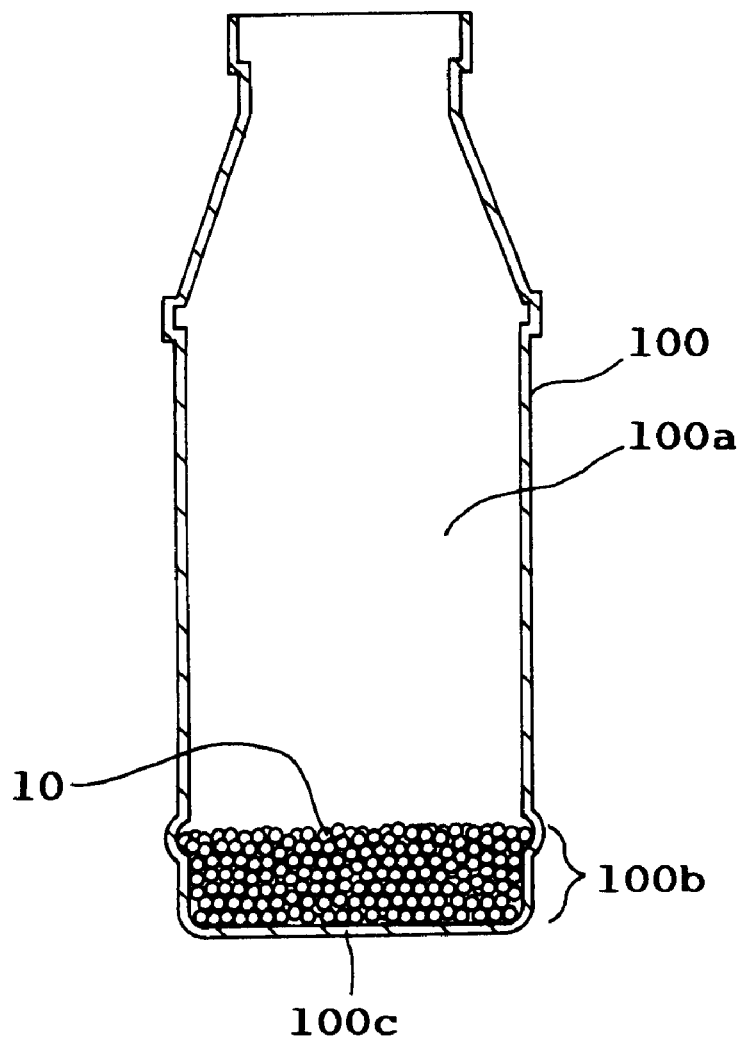
FIG. 3 illustrates a third step of the method for producing yogurt containing encapsulated lactic acid bacteria, in which only the L.A.B.-containing capsules have been put into a lower portion of the yogurt bottle.

As shown in FIG. 3 based on the third step of the first embodiment, and based on the third step of the second embodiment, proper amounts of the L.A.B.-containing capsules 10 are put into the lower portion 100b of the yogurt bottles 100 without encountering any resistance, the proper amounts of the L.A.B.-containing capsules 10 being decided in view of the amount of the liquid yogurt 20 to be filled into the bottles 100.

The proper amount of the L.A.B.-containing capsules 10 to be put into the bottles 100 is such that about one million lactic acid bacteria should be present per ml of the liquid yogurt 20, thereby maximizing the operation of the lactic acid bacteria.

Figure 4:
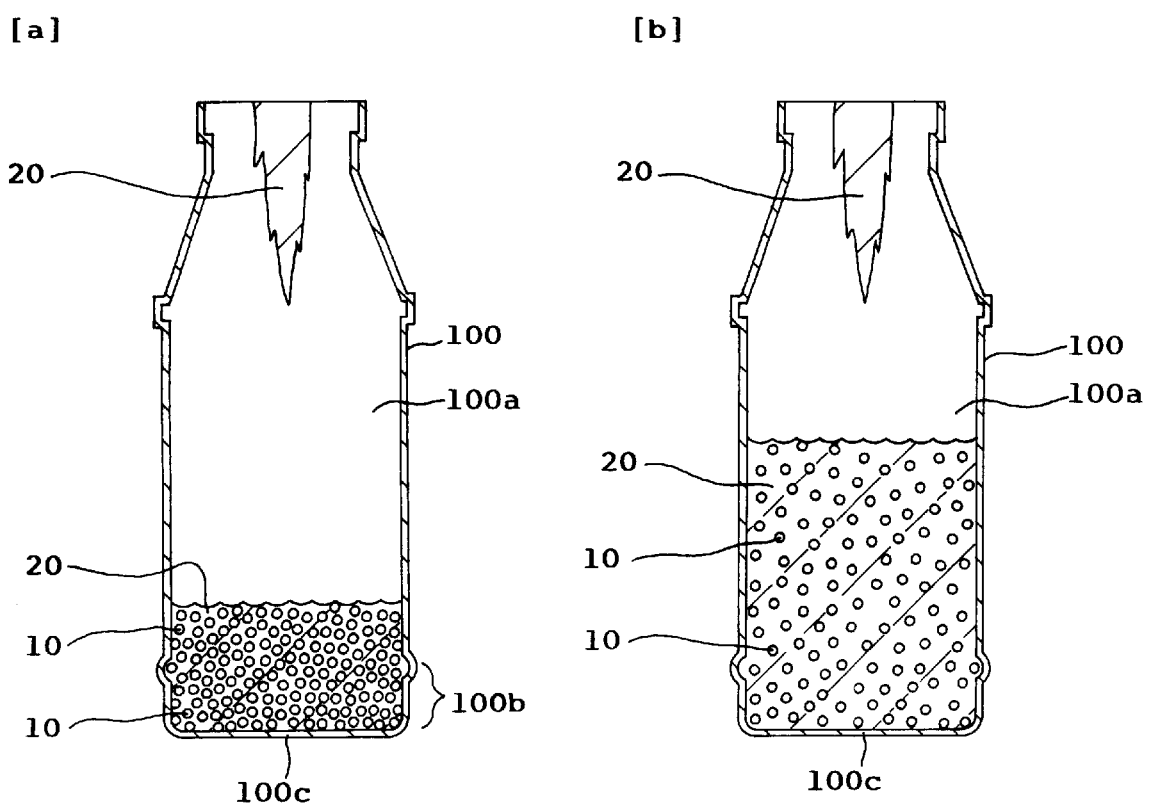
Figure 5:
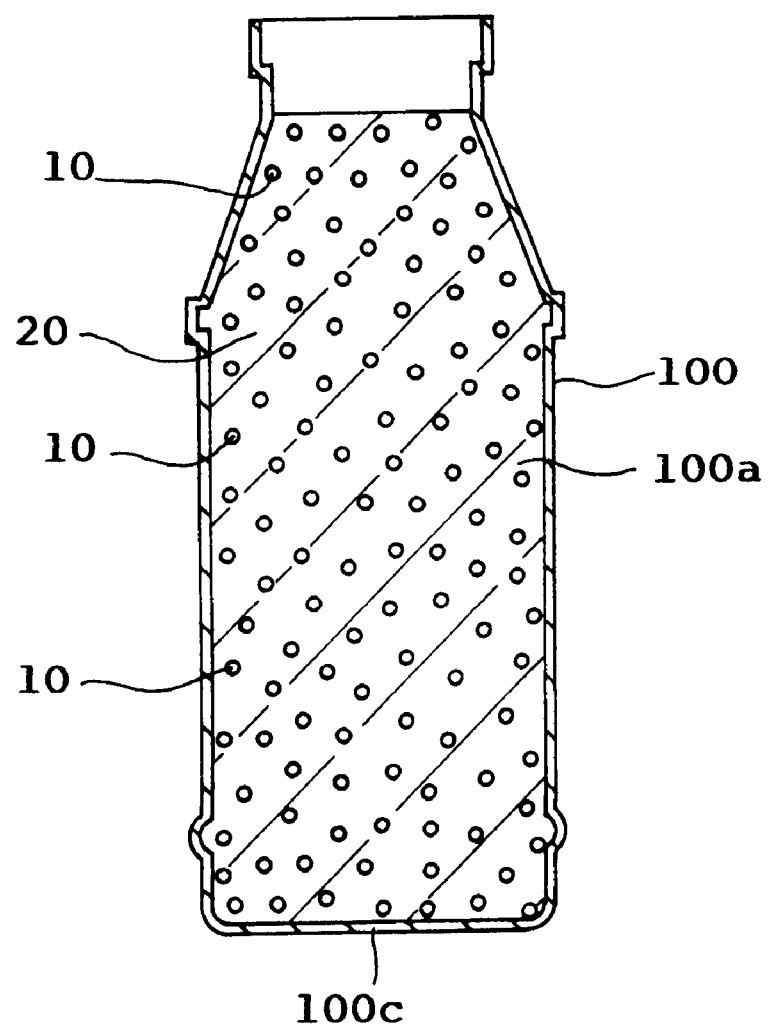
FIG. 5 is a longitudinal sectional view showing the completed stage of filling the container with liquid yogurt according to the fourth step of the method to produce yogurt containing encapsulated lactic acid bacteria uniformly dispersed therein.

As shown in FIG. 4 and FIG. 5, based on the fourth step of the first embodiment, and based on the fourth step of the second embodiment, the liquid yogurt 20 is introduced into the interior 100a of the bottles 100, in a state with the L.A.B.-containing capsules 10 having been put into the lower portion 100b of the yogurt bottle 100 according to the third step. If the liquid yogurt 20 is injected from the above into the interior 100a of the yogurt bottle 100, the level of the liquid yogurt 20 rises from the bottom part 100c upward to fill the interior 100a of the yogurt bottle 100. Accordingly, the L.A.B.-containing capsules 10 are dispersed gradually from the lower portion 100b of the yogurt bottle 100, to be mixed with the liquid yogurt 20. When the liquid yogurt 20 is continuously injected, the L.A.B.-containing capsules 10 are uniformly distributed within the liquid yogurt 20 due to the whirl caused by the injection of the liquid yogurt 20.

Therefore, the L.A.B.-containing capsules 10 are automatically, uniformly distributed in the liquid yogurt 20. Thus when the liquid yogurt 20 is fully filled into the interior 100a of the yogurt bottle 100, the uniform distribution of the L.A.B.-containing capsules 10 within the liquid yogurt 20 becomes perfect.

When the L.A.B.-containing capsules 10 are uniformly distributed in the liquid yogurt 20, since the specific gravity of the L.A.B.-containing capsules 10 and the specific gravity of the liquid yogurt 20 are bilaterally the same or almost the same, there is substantially no difference between the specific gravities of the two. Therefore, the uniform distribution of the L.A.B.-containing capsules in the liquid yogurt 20 can be maintained for a long period of time.

Accordingly, the L.A.B.-containing capsules 10 can be added to the yogurt bottles 100 in uniform amounts so that the product quality can be enhanced.

As to the method for putting the L.A.B.-containing capsules 10 into the interior 100a of the yogurt bottle 100 and distributing them in the liquid yogurt 20, if the methods other than that of the present invention are followed, the following difficulties can be encountered.

If the liquid yogurt 20 and the L.A.B.-containing capsules 10 are mixed in advance before being injected into the interior 100a of the bottles 100, there are encountered the following difficulties, that is, the coating substance 10a of the L.A.B.-containing capsule 10 becomes sticky with water, and therefore, the L.A.B.-containing capsules 10 clog the yogurt-discharging orifice, and as a result the injection of the liquid yogurt 20 into the interior 100a of the bottle 100 becomes difficult. Further, the L.A.B.-containing capsules 10 are sucked into the vacuum path and obstruct the vacuum path, and as a result the injection of the yogurt 20 into the interior 100a of the yogurt bottle 1 becomes difficult.

A method wherein the L.A.B.-containing capsules 10 are added after injecting the liquid yogurt 20 into the interior 100a of the yogurt bottle 100 will be described. In this method, the L.A.B.-containing capsules 10 are not automatically dispersed into the liquid yogurt 20, but are segregated to a corner, thereby aggravating product quality and uniformity. Further, the partly dissolved L.A.B.-containing capsules 10 stick together to form agglomerations, thereby aggravating product quality.

Therefore, the method according to the present invention is particularly desirable, wherein the L.A.B.-containing capsules 10 are put into the lower portion 100b of the yogurt bottle 100 and liquid yogurt 20 is injected into the interior 100a of the yogurt bottle 100 as done in the fourth step of the method for producing yogurt with encapsulated lactic acid bacteria of the present invention. Thus, as the liquid yogurt 20 is introduced into the interior 100a of the yogurt bottle 100, the L.A.B.-containing capsules 10 are automatically dispersed in the liquid yogurt 20, so that proper amounts of the L.A.B.-containing capsules 10 can be provided in the yogurt bottles 100. Thus yogurt with encapsulated lactic acid bacteria of a superior quality can be mass-produced by a simple and speedy process at a low cost.

According to the yogurt with encapsulated lactic acid bacteria of the present invention, as described above, the specific gravity of the L.A.B.-containing capsules 10 and the specific gravity of the liquid yogurt 20 are made to be the same or almost the same, whereby the L.A.B.-containing capsules 10 are uniformly distributed in the liquid yogurt 20. Thus the yogurt with encapsulated lactic acid bacteria is drinkable, and the chewing of the L.A.B.-containing capsules 10 by the teeth is minimized. Therefore, the lactic acid bacteria can be maximally protected from the gastric acid, and can be made to substantially survive until they reach the intestine. Further, the uniform distribution of the L.A.B.-containing capsules 10 in the liquid yogurt 20 can be maintained for a long period of time. Therefore, a high quality yogurt product can be mass-produced by a simple and speedy process at a low cost.

Further, according to the method for producing the yogurt with encapsulated lactic acid bacteria of the present invention, first the specific gravity of the L.A.B.-containing capsules 10 and the specific gravity of the liquid yogurt 20 are made, bilaterally the same or almost the same. Then the L.A.B.-containing capsules 10 are placed in the lower portion 100b of the yogurt bottle 100. Then the liquid yogurt 20 is added to the interior 100a of the yogurt bottle 100, in a state where the L.A.B.-containing capsules 10 are stacked in the lower portion 100b of the yogurt bottle 100. As the liquid yogurt is added, the L.A.B.-containing capsules 10 are automatically and uniformly dispersed in the liquid yogurt 20. Therefore, proper amounts of the L.A.B.-containing capsules 10 are easily dispersed in the bottles 100 in a uniform manner. Further, the uniform distribution of the L.A.B.-containing capsules 10 in the liquid yogurt 20 can be maintained for a long period of time. Therefore, a high quality yogurt product can be mass-produced by a simple and speedy process at a low cost.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A liquid yogurt containing a plurality of capsules encapsulating lactic acid bacteria wherein said bacteria is mixed with a hardened oil and a starch, resulting in a stomach acid-resistant and intestine-soluble coating, and wherein each of the capsules has a specific gravity of about 0.9 to 1.5, and the liquid yogurt has a specific gravity adjusted to be equal to the specific gravity of the capsules, whereby the capsules are maintained in a uniformly dispersed state in the liquid yogurt.

2. A method for producing a liquid yogurt containing a plurality of capsules encapsulating lactic acid bacteria wherein said bacteria is mixed with a hardened oil and a starch, resulting in a stomach acid-proof and intestine soluble coating comprising the steps of:

preparing, as the capsules, capsules having a specific gravity of about 0.9 to 1.5;

preparing, as the liquid yogurt, a liquid yogurt having a specific gravity adjusted to be equal to the specific gravity of the capsules so that the capsules are allowed to be maintained in a uniformly dispersed state in the liquid yogurt;

putting the prepared capsules into a container; and illing the container with the prepared liquid yogurt.

3. A method of producing encapsulated lactic acid and bacteria uniformly dispersed in liquid yogurt, which comprises:

encapsulating a mixture of bacteria, a hardened oil and a starch, the encapsulated mixture having a specific gravity of about 0.9 to 1.5, thereby resulting in a stomach acid-proof and intestine soluble coating, and mixing the encapsulated lactic acid bacteria with the liquid yogurt having a specific gravity matched to be substantially equal to the specific gravity of the capsules by adjusting the amounts and/or kinds and combinations of raw milk, non-fat milk, powdered milk, sugars, stabilizers and/or additives present in said liquid yogurt, whereby the capsules are allowed to be maintained in a uniformly dispersed state in the liquid yogurt.

* * * * *